R. R. LOKEY.
MANURE DISTRIBUTER.
APPLICATION FILED JUNE 21, 1909.

961,506.

Patented June 14, 1910.
2 SHEETS—SHEET 1.

Inventor
Robert R. Lokey.

Witnesses
Jos Gregory

By

Attorneys

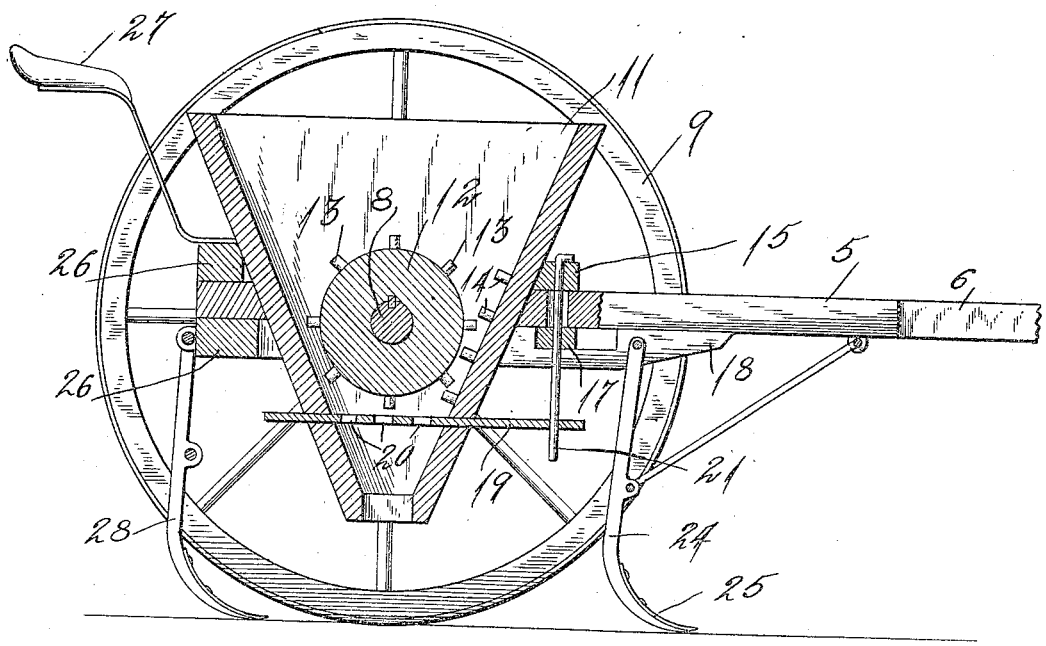
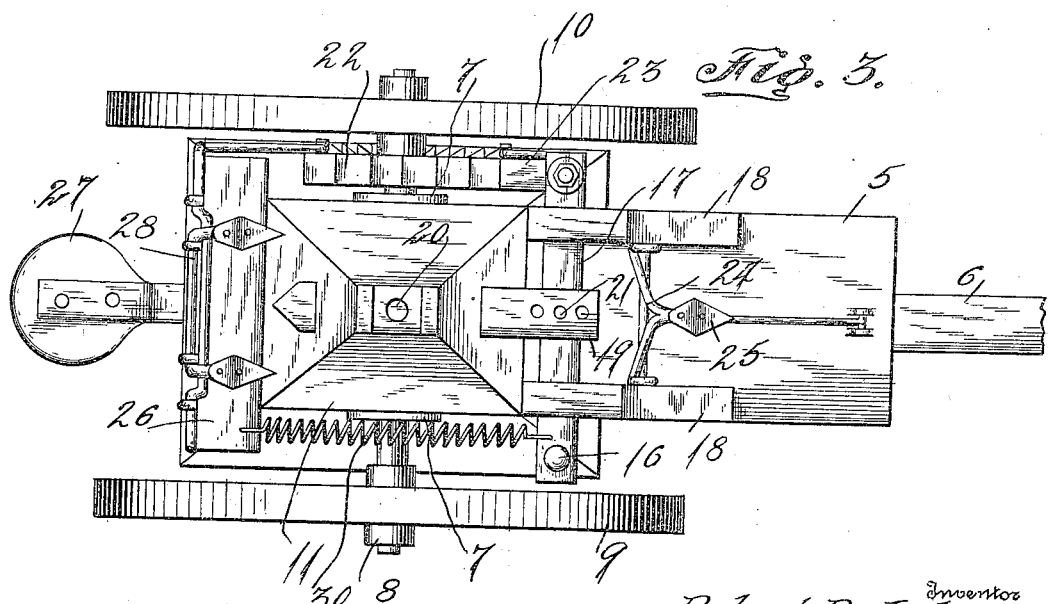

UNITED STATES PATENT OFFICE.

ROBERT R. LOKEY, OF SPARKS, OKLAHOMA.

MANURE-DISTRIBUTER.

961,506.

Specification of Letters Patent. Patented June 14, 1910.

Application filed June 21, 1909. Serial No. 503,456.

*To all whom it may concern:*

Be it known that I, ROBERT R. LOKEY, a citizen of the United States, residing at Sparks, in the county of Lincoln, State of Oklahoma, have invented certain new and useful Improvements in Manure-Distributers; and I do hereby declare the following to be a full, clear, and exact description of the invention, such as will enable others skilled in the art to which it appertains to make and use the same.

The invention relates to a manure distributer and more particularly to the class of machines for depositing manure in rows of open furrows.

The primary object of the invention is the provision of a machine of this character in which manure is contained within a hopper supported upon a wheeled frame and is adapted to deliver manure in predetermined quantities in a row or in an open furrow during the advancement of the machine through a field or over the ground.

Another object of the invention is the provision of a machine which is adapted to be drawn through a field and will deposit manure in an even and uniform manner in rows or in open furrows, the feeding of the manure to the ground being controlled by one of the wheels of the supporting frame, and means to regulate the discharge of the manure from a hopper supported by the frame of the machine.

A further object of the invention is the provision of a manure distributer which is simple in construction, thoroughly efficient and reliable in operation and inexpensive in the manufacture.

With these and other objects in view, the invention consists in the construction, combination and arrangement of parts as will be hereinafter more fully described in detail, illustrated in the accompanying drawings which disclose the preferred form of embodiment of the invention, to enable those skilled in the art to practice the same, and as set forth in the claim hereunto appended.

Figure 1:
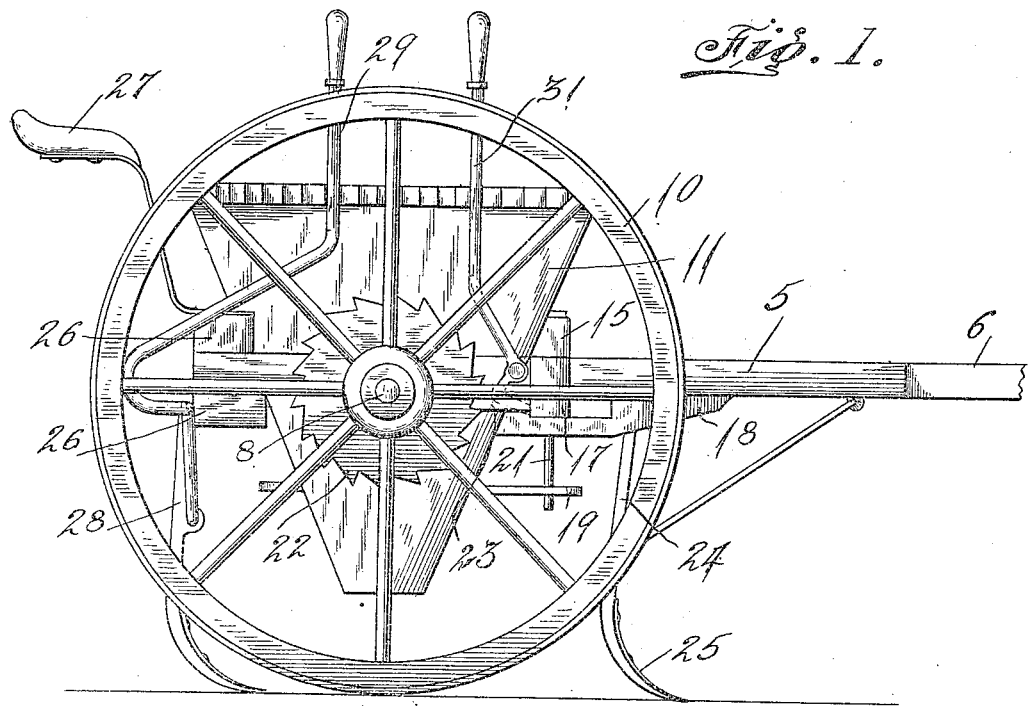
Figure 2:
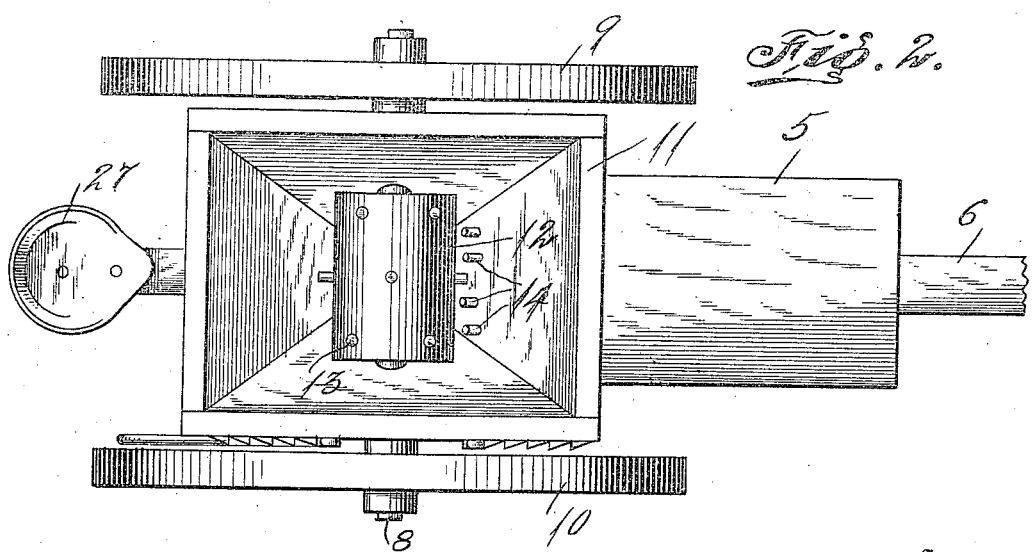

In the drawings: Figure 1 is a side elevation of the invention. Fig. 2 is a top plan view thereof. Fig. 3 is a bottom plan view. Fig. 4 is a longitudinal sectional view.

Similar reference characters indicate corresponding parts throughout the several views in the drawings.

In the drawings, the numeral 5 designates a platform terminating at its forward end in a draft tongue or pole 6, to which draft animals are adapted to be hitched for advancing a machine through a field. Secured near the rear end of the platform to its under face are bearings 7, in which is journaled a rotatable axle 8, the latter having mounted thereon at opposite ends ground supporting wheels 9 and 10, the latter being rigidly fixed to the axle while the remaining wheel is held loose upon said axle to permit the proper turning of the machine.

Mounted upon the platform 5 is a hopper 11, the same being mounted so that its tapering bottom projects through the platform to a considerable distance below the same, and this bottom is provided with a suitable discharge port or opening to permit the delivery of manure on to the ground.

Fixed to the axle 8 and disposed within the hopper is a crusher roller 12, the same having projecting from its outer face a plurality of spurs or teeth 13, which latter serve to disintegrate the material when placed within the hopper. Projecting from the front end wall of the hopper are a plurality of teeth 14, the latter being so disposed as to operate upon the material within the hopper so as to assist the pressure roller in breaking lumps of material to completely disintegrate the same prior to its discharge from the hopper.

Mounted upon the platform 5, contiguous to the front end of the hopper is a cross beam 15, to which is connected by a pivot 16, a reciprocating bar or lever 17, the latter being guided in its movement beneath the platform 5, by parallel guide pieces 18, secured to the under face of said bottom. Mounted in suitable openings in the hopper near the discharge opening in its bottom is a slidable feed plate 19, the latter containing a row of spaced apertures 20, which latter control the delivery of material from the hopper through its discharge port or opening in the bottom thereof.

Detachably mounted in the cross beam 15, centrally thereof and passing through a suitable slot in the platform 5, is a coupling pin 21, the latter adjustably connecting the feed plate to the reciprocating lever 17, so that the latter may be operated in the manner as will be hereinafter described.

Fixed to the axle 8, at one side of the platform 5, is a ratchet wheel 22, the teeth of which being adapted to engage a right angular extension or arm 23, fixed to the free end of the reciprocating lever 17, so that upon advancement of the machine the arm or extension 23 is adapted to ride over the teeth of the ratchet wheel 22, thus reciprocating the lever 17 to actuate the feed plate 19, to work the same back and forth within the hopper and thereby regulate the discharge of material through the discharge opening in its bottom.

Mounted between the guide pieces 18 beneath the platform is a depending plow standard 24, the same having fixed to its lower end a furrow opener 25, which latter is adapted to form an open furrow during the advancement of the machine prior to the delivery of material from the hopper on to the ground. Secured to the rear end of the platform above and below the same are cross beams 26, the uppermost one of which has mounted thereon a driver seat 27, and to the lowermost beam is connected a pair of furrow closers 28, the latter being adjustable with respect to the ground by means of a throw lever 29, of the usual construction and these furrow closers are adapted to travel in rear of the discharge hopper, to close the open furrow subsequent to the deposit of manure therein.

Connected near the pivoted end of the reciprocating lever 17, is a retractile spring 30, the latter also connected to the lowermost cross beam 26, and this spring 30, serves to hold the extension or arm 23, in normal contact with the ratchet wheel, during the travel of the machine.

Pivoted to one longitudinal edge of the platform is a throw lever 31, the lower end of which is arranged in the path of movement of the reciprocating lever 17, and is adapted to be moved in one direction to shift said lever 17, or displace the same so that its extension or arm 23, will be freed from engagement with the ratchet wheel and in this manner the feed plate may be held inoperative.

It is obvious that the contents of the hopper will be automatically delivered therefrom in a uniform manner during the advancement of the machine as the operation of the feed plate is controlled through the medium of one of the wheels of the machine when the same is being drawn through a field or over the ground.

What is claimed is:—

In a machine of the class described, a hopper having a discharge opening, a wheeled frame supporting the hopper, a ratchet wheel fixed to one of the wheels of the frame, a perforated slide working transversely through the hopper directly above its discharge opening, guide brackets fixed to the frame adjacent the hopper, a cross bar slidable in said brackets and having one end pivoted to the frame, an extension formed on the cross bar and normally engaging the ratchet wheel, a retractile spring connected to the frame and to the cross bar to hold the extension in the path of movement of the ratchet wheel, a detachable pin connecting the slide to the cross bar, a pivotal lever carried by the frame and having one end projected into the path of movement of the cross bar and adapted to normally hold the same inoperative and an agitator within the hopper and actuated by the wheels of the frame.

In testimony whereof, I affix my signature, in presence of two witnesses.

ROBERT R. LOKEY.

Witnesses:
  LESLIE ALLEN,
  A. W. DUKE.